(12) United States Patent
Belanger et al.

(10) Patent No.: US 11,879,867 B2
(45) Date of Patent: Jan. 23, 2024

(54) ULTRASOUND TESTING OF ADHESIVE BONDS

(71) Applicant: ECOLE DE TECHNOLOGIE SUPERIEURE, Montreal (CA)

(72) Inventors: Pierre Belanger, Montreal (CA); Daniel Pereira, Montréal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 21 days.

(21) Appl. No.: 17/847,268

(22) Filed: Jun. 23, 2022

(65) Prior Publication Data

US 2022/0412922 A1 Dec. 29, 2022

Related U.S. Application Data

(60) Provisional application No. 63/213,942, filed on Jun. 23, 2021.

(51) Int. Cl.
  *G01N 29/11* (2006.01)
  *G01N 29/28* (2006.01)

(52) U.S. Cl.
  CPC ............ *G01N 29/11* (2013.01); *G01N 29/28* (2013.01); *G01N 2291/0231* (2013.01); *G01N 2291/044* (2013.01)

(58) Field of Classification Search
  CPC ........ G01N 29/11; G01N 29/28; G01N 29/46; G01N 29/043; G01N 29/4436; G01N 29/07; G01N 2291/0231; G01N 2291/044
  USPC ............................................................ 73/334
  See application file for complete search history.

(56) References Cited

U.S. PATENT DOCUMENTS

| | | | |
|---|---|---|---|
| 6,982,178 B2* | 1/2006 | LeCain | G02F 1/1309 438/30 |
| 9,336,588 B2* | 5/2016 | Crothers | B29C 66/1122 |
| 10,677,759 B2* | 6/2020 | Humfeld | C09J 11/04 |
| 11,619,614 B2* | 4/2023 | Harper | G01N 29/46 73/579 |
| 2019/0127615 A1* | 5/2019 | Humfeld | C09J 161/06 |

FOREIGN PATENT DOCUMENTS

EP 0515734 * 12/1992

* cited by examiner

*Primary Examiner* — Jacques M Saint Surin
(74) *Attorney, Agent, or Firm* — NORTON ROSE FULBRIGHT CANADA LLP

(57) ABSTRACT

There are described a system and method for performing ultrasound testing of a component comprising a first material layer and a second material layer bonded by an adhesive layer. The method comprises applying input ultrasound to the component to cause longitudinal propagation of ultrasonic guided waves through the first material layer and the adhesive layer; acquiring acoustic waves from the component, wherein the acoustic waves produced by the longitudinal propagation of the ultrasonic guided waves; generating a signal representation of the acoustic waves; comparing the signal representation of the acoustic waves to a plurality of reference signals to identify a characteristic of the adhesive layer; and outputting an output signal indicative of the characteristic of the adhesive layer.

18 Claims, 8 Drawing Sheets

ULTRASOUND TESTING OF ADHESIVE BONDS

CROSS-REFERENCE TO RELATED APPLICATIONS

The present application claims priority under 35 USC 119(e) of U.S. Provisional Patent Application No. 63/213,942, filed on Jun. 23, 2021, the contents of which are hereby incorporated by reference.

TECHNICAL FIELD

The present disclosure relates generally to the field of ultrasound testing, and more specifically to testing of adhesive bonds.

BACKGROUND

In many industries where high reliability and quality assurance are sought, defect detection processes are often required before a product, part, or system can be sold or used. Ensuring the absence of defects may go beyond simply ensuring customer satisfaction, as regulatory bodies may mandate various defect detection processes to ensure user safety. Ultrasound testing (UT) is an inspection method used to detect flaws in a component, such as cracks, voids, or inclusions.

Existing UT techniques may use ultrasound probes which scan a component with ultrasound waves or beams. Various signal and image processing steps are performed on the scanning results, for instance via a suitable computing device. Some existing techniques may also attempt to evaluate components which are composed of adhesively-bonded materials.

Though these existing techniques may be appropriate for certain situations, improvements remain desirable.

SUMMARY

In accordance with one aspect, there is provided a method for performing ultrasound testing of a component comprising a first material layer and a second material layer bonded by an adhesive layer. The method comprises applying input ultrasound to the component to cause longitudinal propagation of ultrasonic guided waves through the first material layer and the adhesive layer; acquiring acoustic waves from the component, wherein the acoustic waves produced by the longitudinal propagation of the ultrasonic guided waves; generating a signal representation of the acoustic waves; comparing the signal representation of the acoustic waves to a plurality of reference signals to identify a characteristic of the adhesive layer; and outputting an output signal indicative of the characteristic of the adhesive layer.

In accordance with another aspect, there is provided a system for performing ultrasound testing of a component comprising a first material layer and a second material layer bonded by an adhesive layer. The system comprises a processing unit and a non-transitory computer-readable medium having stored thereon instructions. The instructions are executable by the processing unit for applying input ultrasound waves to the component to cause longitudinal propagation of ultrasonic guided waves through the first material layer, the second material layer and the adhesive layer; acquiring acoustic waves from the component, wherein the acoustic waves produced by the longitudinal propagation of the ultrasonic guided waves; generating a signal representation of the acoustic waves; comparing the signal representation of the acoustic waves to a plurality of reference signals to identify a characteristic of the adhesive layer; and outputting an output signal indicative of the characteristic of the adhesive layer.

Many further features and combinations thereof concerning embodiments described herein will appear to those skilled in the art following a reading of the instant disclosure.

BRIEF DESCRIPTION OF THE DRAWINGS

In the figures.

It will be noted that throughout the appended drawings, like features are identified by like reference numerals.

DETAILED DESCRIPTION

The present disclosure provides methods and systems for performing non-destructive testing (NDT), including NDT methods and systems using ultrasound testing (UT). The various embodiments and approaches for UT may be used to characterize adhesive bonds in components, for instance components formed of multiple layers of material bonded by an adhesive layer. The material layers may include layers of composite material, layers of metallic materials, layers of other types of material, and any suitable combination of material layers. Additionally, the present disclosure considers adhesive bonds formed using various types of adhesives, which may be applied between material layers in any suitable fashion.

Figure 1A:
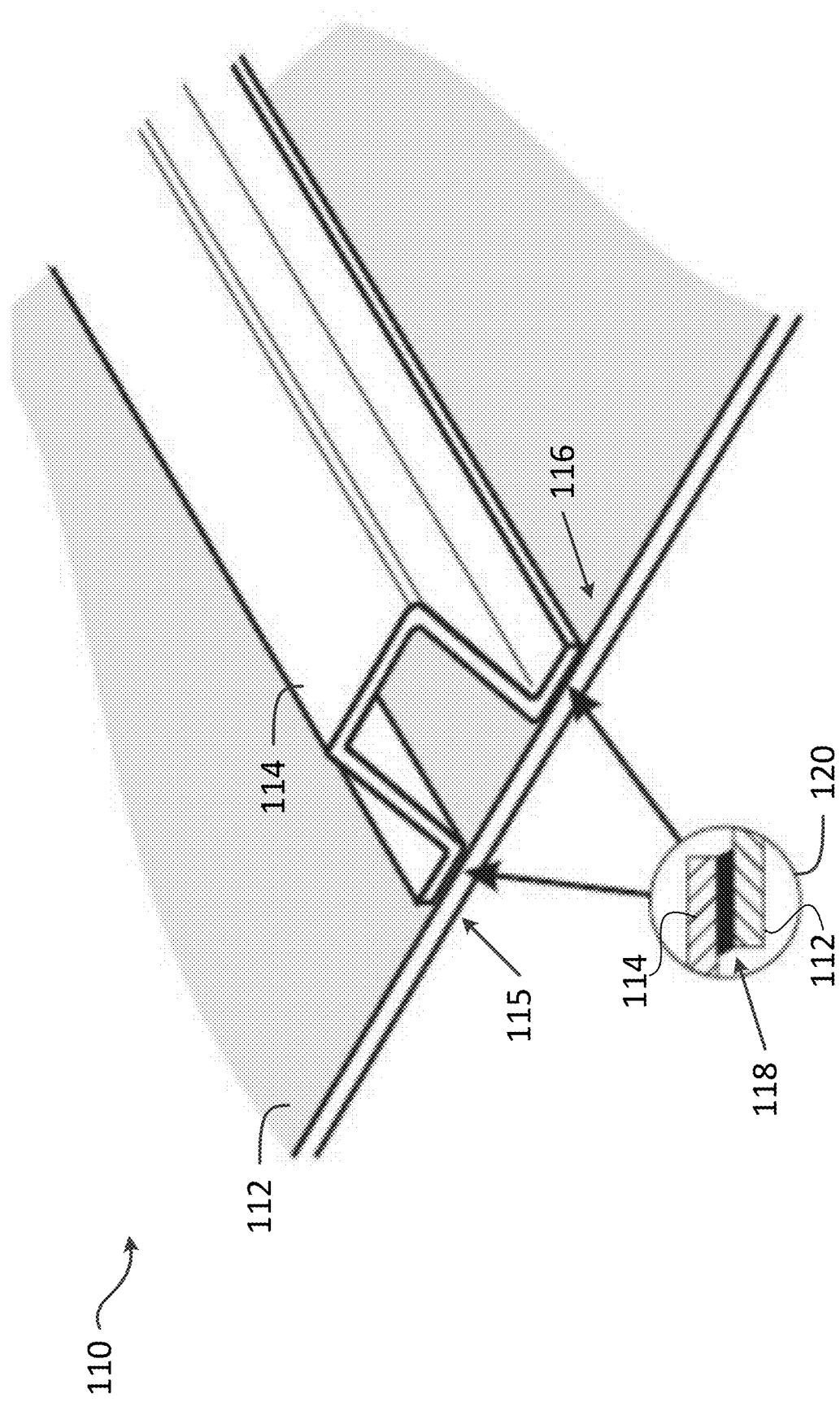
FIG. 1A illustrates an example component comprising an adhesive bond.

With reference to FIG. 1A, there is illustrated a component 110 composed of a first material layer 112 and a second material layer 114. The material layers 112, 114 are bonded together at locations 115, 116 via an adhesive 118, which forms an adhesive bond 120. The adhesive 118 may be any suitable type of adhesive, and may be selected, for instance, on the basis of the type of material which composes the material layers 112, 114. The component 110 may be formed by applying the adhesive 118 to one or both of the material layers 112, 114 at suitable locations thereon, and then by bringing the material layers 112, 114 into contact with one another. In some embodiments, a retaining force may be applied to facilitate the creation of the adhesive bond 120, and the retaining force may be maintained for a particular amount of time. Although the second material layer is provided with a particular shape, it should be understood that the embodiment illustrated in FIG. 1 is provided as an example only, and that other uses cases are also considered.

Figure 1B:
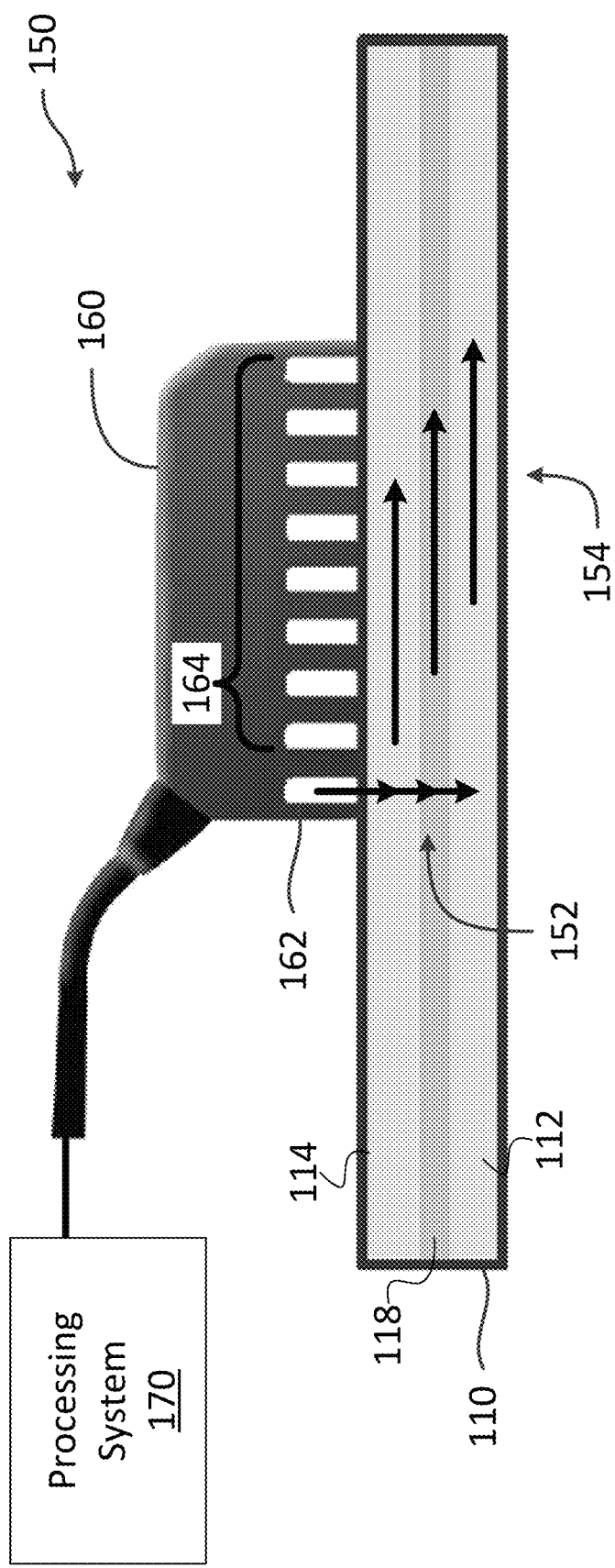
FIG. 1B illustrates an example ultrasound testing (UT) system.

With reference to FIG. 1B, once the adhesion of the material layers 112, 114, has been performed, it may be desirable to asses various characteristics of the adhesive bond 120 formed by the adhesive 118 between the material layers 112, 114. To this end, a UT system 150 is provided for performing UT of the component 110. The UT system 150 is composed of an ultrasound probe 160 and a processing system 170 coupled to the ultrasound probe 160.

The ultrasound probe 160 is configured for direct or indirect contact with the component 110. Indirect contact may be provided by a coupling medium, such as but not limited to water, oil, cream, gel, and the like. The ultrasound probe may be any suitable type of probe, for instance a phased array probe, and may include any suitable number of emitters, and any suitable number of receivers. In the example of FIG. 1B, the ultrasound probe 160 includes an emitter 162 and a plurality of receivers 164. In other embodiments, the ultrasound probe 160 may include one or more piezoelectric transducers and a laser vibrometer. In further embodiments, other types of ultrasound probes 160 may be used.

The emitter 162 is configured for the application of input ultrasound waves 152 to the component 110, which cause ultrasonic guided waves 154 to longitudinally propagate through the material layers 112, 114 and through the adhesive layer 118 of the component 110. The ultrasonic guided waves 154 propagate in a direction substantially perpendicular to the input ultrasound waves 152, and propagate along the length (or width) of the layers 112, 114, 118 of the component 110, rather than along the height (or thickness) of the layers 112, 114, 118 of the component 110. The receivers 164 are used to acquire acoustic waves from the component 110, which result from the propagation of the ultrasonic guided waves 154 through the component 110.

The processing system 170 is communicatively coupled to the ultrasound probe 160, and acquires therefrom information relating to the input ultrasound waves 152 and to the acoustic waves which are acquired by the receivers 164. The processing system 170 is configured for processing information received from the ultrasound probe 160, for instance to assess various characteristics of the adhesive bond 120 formed by the adhesive 118 between the material layers 112, 114. The processing system 170 may be implemented via any suitable computer or other computing device, as appropriate.

Figure 2:
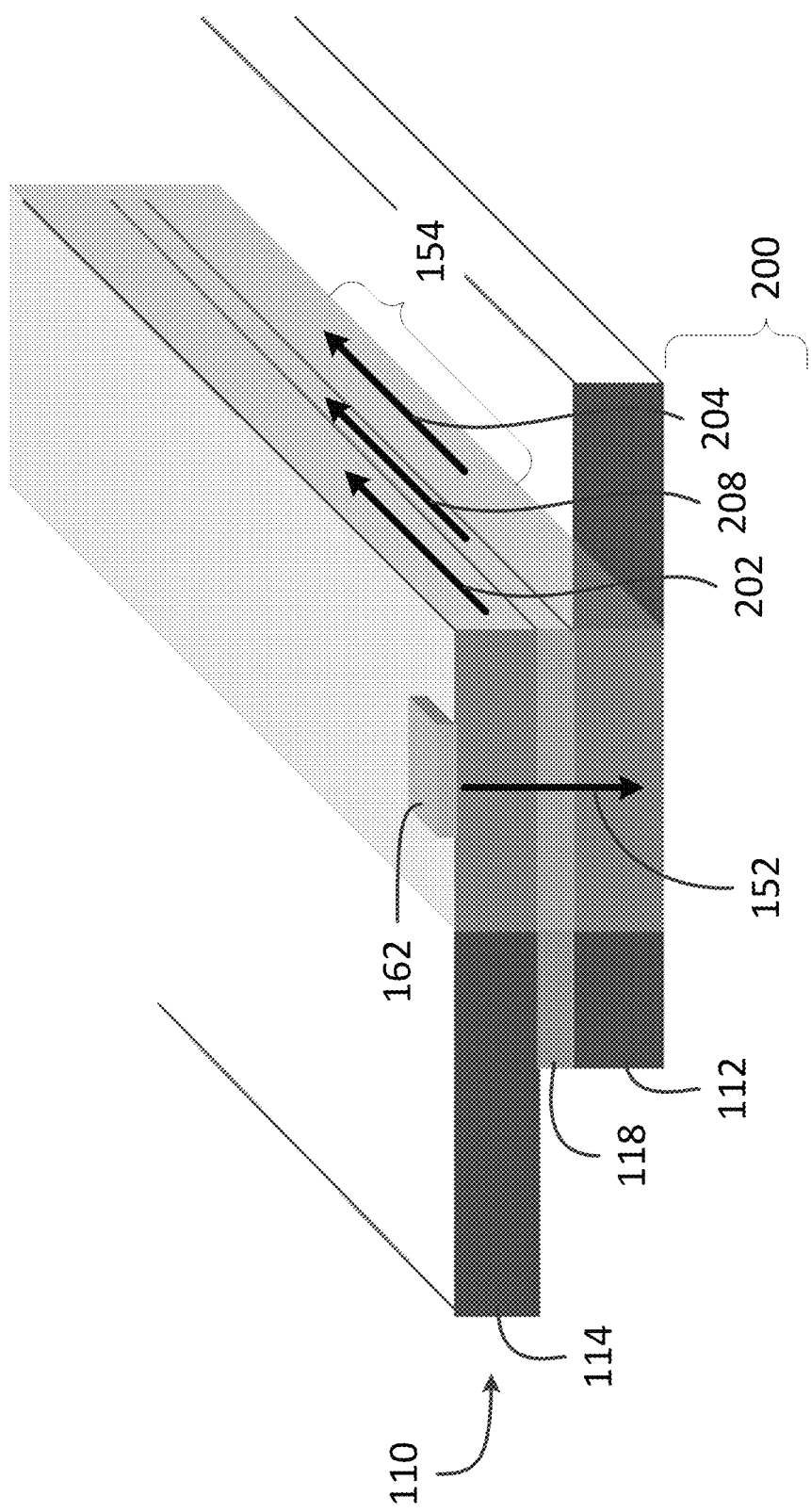
FIG. 2 illustrates a cutaway view of an example component comprising an adhesive bond.

With additional reference to FIG. 2, the input ultrasound waves 152 produced by the emitter 162 cause the ultrasonic guided waves 154 to longitudinally propagate through the material layers 112, 114 and through the adhesive layer 118 of the component 110. The ultrasonic guided waves 154 propagate through the component 110 in different propagation modes 200. Each of the layers 112, 114, 118 may be associated with one or more respective modes: in the illustrated example, the mode 202 propagates through the material layer 114, the mode 204 propagates through the material layer 112, and the mode 208 propagates through the adhesive layer 118. It should be understood, however, that additional modes may also propagate through one or more of the layers 112, 114, 118. A broadband frequency emission containing several modes may be used for the input ultrasound waves. The emitted frequency range may be lower than the one used for conventional UT. The range may be defined according to the proprieties and thickness of the substrate material. For instance, a bonded joint composed of two 1 mm aluminum plates bonded by a 0.2 mm adhesive layer could use a bandwidth within 50 kHz and 2 MHz. In some other embodiments, the input ultrasound waves 152 have a frequency in the range of 0.9-1.1 MHz. In some further embodiments, the input ultrasound waves 152 have a frequency in the range of 0.5-2.5 MHz. Still other frequencies are considered. Any frequency allowing longitudinal propagation of ultrasonic guided waves through the layers of the component may be used.

Figure 3B:
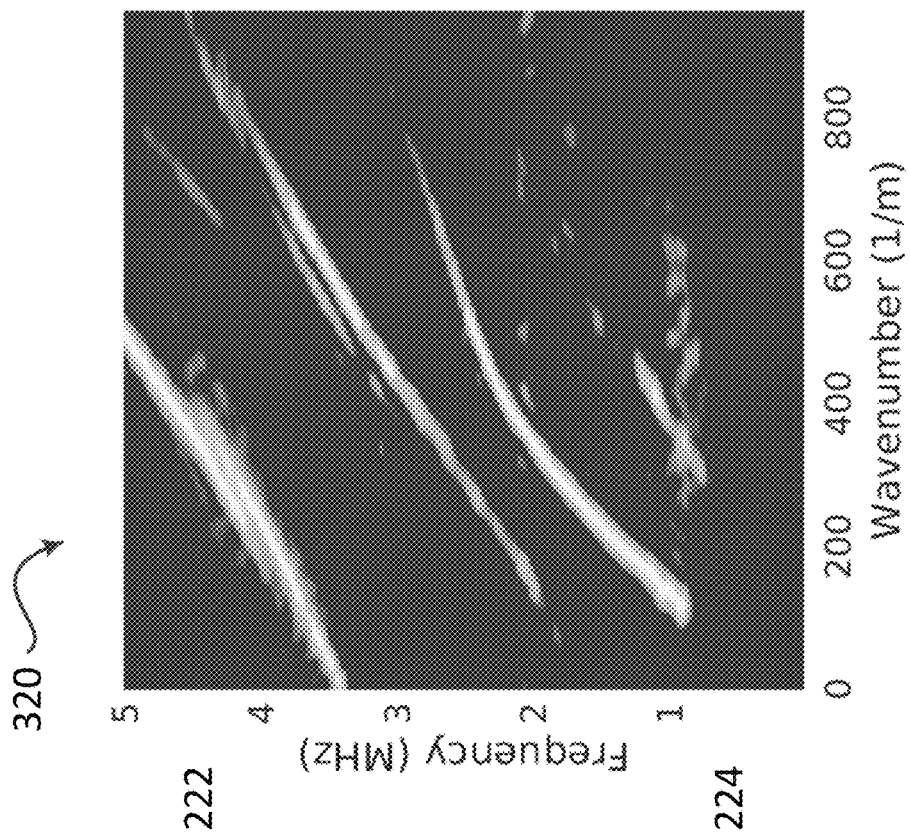
FIGS. 3A-3B illustrate example representations of acoustic waves acquired by the UT system of FIG. 1B.
Figure 3A:
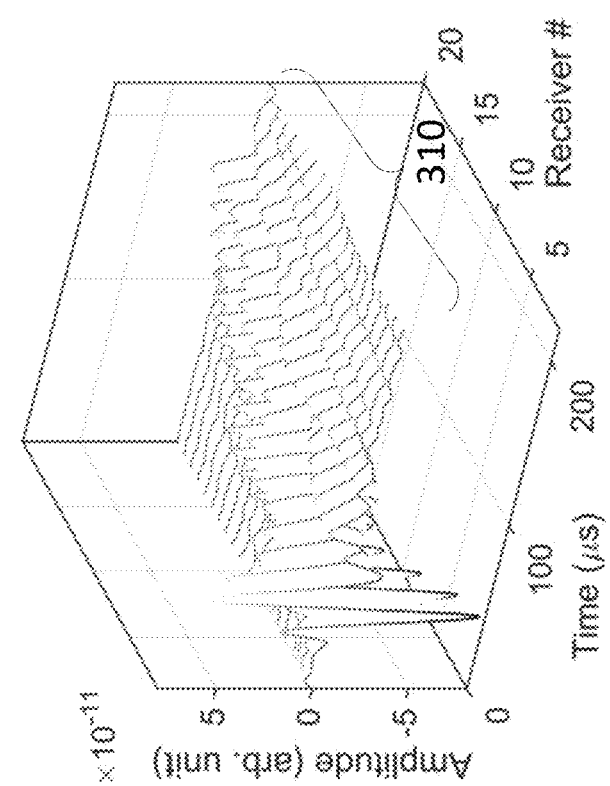

The receivers 164 of the ultrasound probe 160 are configured for acquiring acoustic waves resulting from the propagation of the modes 202, 204, 208 of the ultrasonic guided waves 154 in the component 110. In some embodiments, the acoustic waves are acquired as time-domain signals. Examples of the time-domain signals, termed multi-modal signals 310, are illustrated in FIG. 3A. The multi-modal signals 310 are shown as amplitude (y-axis) versus time (x-axis), for a plurality of receivers (z-axis), such as receivers 164. As can be seen from the shape of the waveforms, receivers 164 positioned further away from the emitter 162 will receive the acoustic wave after receivers 164 positioned closer to the emitter. The multi-modal signals 310 are indicative of propagation properties of the ultrasonic guided waves 154, including the properties of the modes 200 in each of the layers 112, 114, 118. The propagation properties may then be used to characterize the adhesive bond 120 for quality assessment purposes.

Following acquisition, acoustic waves may be processed, for instance by the processing unit 170, so as to produce a signal representation of the adhesive bond 120. In FIG. 3B, an example processing technique is illustrated, in which a two-dimensional (2D) fast-Fourier transform (FFT) is applied to the multi-modal signals 310, thereby producing the signal representation 320. In this example, the signal representation is shown as frequency (y-axis) expressed in MHz vs wavenumber (x-axis) expressed in reciprocal meters (1/m or $m^{-1}$). The wavenumber is the spatial frequency of a wave, measured in cycles per unit distance or radians per unit distance. Although the foregoing discussion focuses primarily on techniques in which the signal representation 320 is used, it should be understood that the signal representation 320 is one embodiment for processing the multi-modal signals 310 to produce a signal representation of the adhesive bond 120, and that references hereinbelow to the use of the signal representation 320 may be substituted for any other suitable embodiment.

The signal representation 320 comprises information on the propagation of each of the modes 200 in the layers 112, 114, 118 and is thus indicative of various characteristics of the adhesive bond 120 when compared to reference signals associated with adhesive bonds of known characteristics, the characteristics being quality parameters. Examples of quality parameters of the adhesive bond 120 may be, but are not limited to, shear modulus, Poisson's coefficient, stiffness tensor components, a density of the adhesive, and the presence of defects, such as wrinkles, in the component 110 and/or the adhesive bond 120.

In order to determine the characteristics of the adhesive bond 120, the signal representation 320 is compared to multiple reference signals associated with reference adhesive bonds having known characteristics. The reference signals may be of a same format as the 2D representation 320 such that they may be compared easily. The reference signals may be obtained from experimental data, from simulations, or from any other suitable source.

Figures 4A, 4B:
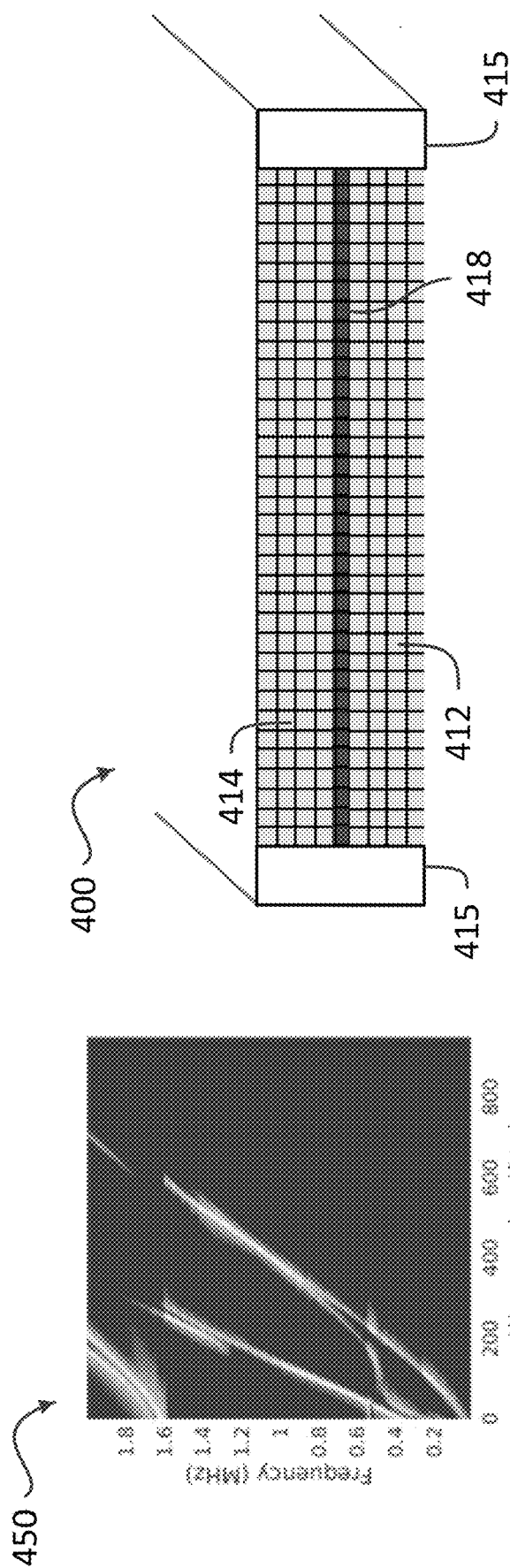
FIGS. 4A-4B illustrate an example finite-element model of the component of FIG. 1A.

With reference to FIGS. 4A-4B, in some embodiments, the reference signals may be reference 2D-FFTs 450 produced via simulation, as shown in FIG. 4A, using a finite-element model (FEM) 400 to simulate components having an adhesive bond, as shown in FIG. 4B. The FEM 400 is composed of simulated material layers 412, 414, and a simulated adhesive layer 418. The FEM 400 serves as a "forward model", and simulated reference signals, in the form of reference 2D-FFTs 450, are compared against the 2D representation 320. When a particular reference 2D-FFT 450 is found to match the 2D representation 320 sufficiently closely, for instance to within a particular threshold, or is found to be the closest match of a group of reference 2D-FFTs 450, the characteristics of the FEM 400 which, when simulated, produced the particular reference 2D-FFT 450, can be attributed to the adhesive bond 120 associated with the 2D representation 320, and/or to the component 110 more generally.

In some embodiments, the FEM 400 is composed of isotropic, homogeneous media in the form of the layers 412, 414, 418, which model the layers 112, 114, 118 of the component 110. Two geometrical parameters may be used to describe the geometry of the FEM 400: the thickness of the simulated material layers 412, 414, and the thickness of the simulated adhesive layer 418. The simulated material layers 412, 414, may be assigned three mechanical parameters: a Young's modulus, a density, and a Poisson's ratio. The simulated adhesive layer 418 may also be assigned three mechanical parameters: a shear modulus, a density, and a Poisson's ratio. To reduce reflections caused by the extremities of the FEM 400, absorption regions 415 may be included in the FEM 400. In some embodiments, the FEM 400 is composed of hexagonal elements, for instance having a side length of 0.2 mm. Simulations of the FEM 400 may be performed in the time domain by simulating the emission of input ultrasound waves into the FEM 400, using any suitable time-step duration, and simulating the acquisition of acoustic waves from the FEM 400. For example, the load caused by the ultrasound probe 160 may be simulated by applying an out-of-plane load to an outer surface of the simulated material layer 414.

Modeling of the simulated adhesive layer 418 may be based on various experimental data. For example, the speed of sound in an adhesive resin may be measured using cylindrical samples of cured resins: an ultrasound probe may be placed on a top surface of the cylindrical resin sample to measure time-of-flight delay between subsequent echo pulses. The speed of sound in the adhesive resin may be found via:

$$C_{l,s} = \frac{2TH}{\Delta t_{l,s}} \qquad (1)$$

in which $C_l$ is the longitudinal speed of sound, $C_s$ is the transverse speed of sound, TH is the thickness of the resin sample, $\Delta t_l$ is the longitudinal time-of-flight, and $\Delta t_s$ is the transverse time-of-flight.

Using the longitudinal and transverse speeds of sound in the resin samples, the Young's and shear modulus of the resin samples may be determined using:

$$E = \frac{\rho(1+v)(1-2v)}{1-v} \cdot C_l^2 \qquad (2)$$

$$G = \rho C_s^2 \qquad (3)$$

in which E is the Young's modulus, G is the shear modulus, $\rho$ is the density of the resin, and v is the Poisson's ratio of the resin.

The simulated acoustic waves acquired using the FEM 400 may be used to produce the reference 2D-FFT 450; by varying the parameters of the layers 412, 414, 418 of the FEM 400, different reference 2D-FFTs 450 may be obtained. The FEM 400 may thus be used to produce a plurality of reference signals, in the form of the reference 2D-FFTs 450, each associated with a different configuration of the FEM 400 having different parameters for the layers 412, 414, 418. When the 2D representation 320 is generated by the processing system 170, it can then be compared to the different reference 2D-FFTs 450 to identify a close or closest match, which in turn can be used to inform about the characteristics of the adhesive bond 120 and/or of the component 110.

In order to compare the signal representation 320 to the different reference 2D-FFTs 450, an error function (sometimes known as a cost function, a penalty function, or the like) may be implemented: minimization of the error function is sought to identify a closest match for the signal representation 320. In embodiments in which the FEM 400 is used to produce the reference 2D-FFTs 450, since the forward model is based on the FEM 400 and the time-domain simulations thereof, the simulated reference signals are analogous to the multi-modal signals 310 acquired from the component 110, and the signal representation 320 is analogous to the reference 2D-FFTs 450. For example, the error function can be defined on the basis of a misfit between amplitudes in the reference 2D-FFTs 450 and the signal representation 320, and evaluated as a sum of squared differences at each frequency, and at each wavenumber:

$$J_i(\theta') = \sum_{f=f_i}^{f_e} \sum_{k=k_i}^{k_e} \sqrt[2]{(A_{exp}(k,f) - A_{sim}(k,f,\theta'))^2} \qquad (4)$$

in which $J_i$ is the misfit, $\theta'$ is a given set of model parameters, f is the frequency (with fi and fe being the initial and final frequencies, respectively), k is the wavenumber (with ki and ke being the initial and final wavenumbers, respectively), $A_{exp}$ is the experimental data associated with the 2D representation 320, and $A_{sim}$ is the simulated data associated with the reference 2D-FFTs 450. The model parameters θ used in Equation 4 include the thickness $Th_p$ of the simulated material layers 412, 414, the thickness $Th_a$ of the simulated adhesive layer 418, the Young's modulus E of the simulated material layers 412, 414, and the shear modulus G of the simulated adhesive layer 418, such that any set of model parameters $\theta'$ is selected from $\theta=[Th_p\ Th_a\ E\ G]$. The density of the adhesive of the simulated adhesive layer 418, and the Poisson's ratio for the material of the simulated material layers 412, 414 and of the adhesive of the simulated adhesive layer 418 may be selected as constants.

Figure 5:
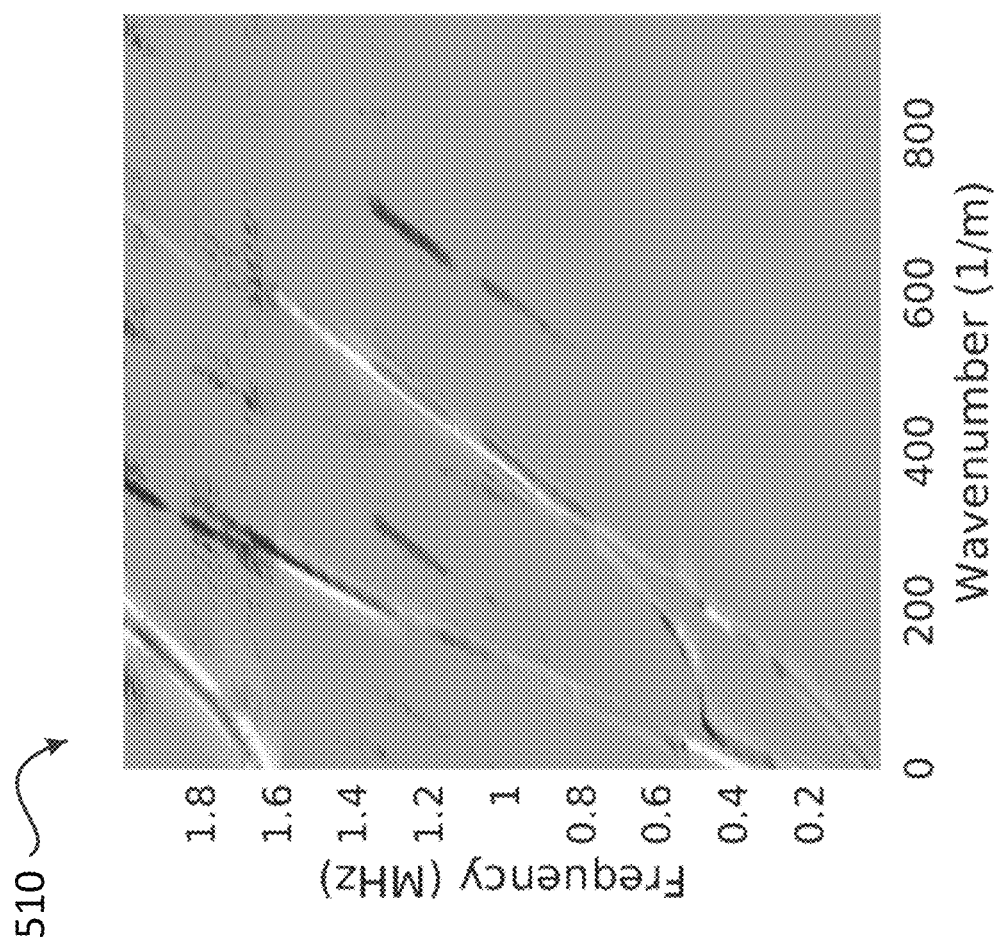
FIG. 5 illustrates an example representation of an error function based on the acoustic waves acquired by the UT system of FIG. 1B.

With reference to FIG. 5, an example signal representation 510 of the error function of Equation 4, following a minimization procedure, is illustrated. In some embodiments, the minimization procedure is performed on the basis of separating the model parameters into two classes: a first class $\theta_1=[Th_p\ Th_a\ E]$, consisting of model parameters which are expected to remain constant throughout the curing process for the simulated adhesive layer 418, and a second class $\theta_2=[G]$, consisting of the shear modulus of the simulated adhesive layer, which is expected to vary during the curing process. Thus, the error function of Equation 4 can be calculated for a given set of model parameters for the first class $\theta'_1$ by identifying the minimum value for the misfit $J_i$ considering all possibilities for the second class $\theta_2$ of model parameters, then summing over the values of the experimental data associated with the signal representation 320:

$$P(\theta_1') = \sum_{i=1}^{N} \min(J_i(\theta_1' \theta_2)) \quad (5)$$

in which N is the total number of measurements taken as part of the multi-modal signals 310, and thus the total number of measurements represented in the signal representation 320.

The overall error function of Equation 4 can therefore be minimized by finding optimal solutions for the first and second classes $\theta_1$, $\theta_2$, referred to as $\theta_1^o$, $\theta_2^o$ by identifying the minimum value of the misfit $J_i$ over all different scenarios for $\theta_1$, such that $$\theta_1^o = \min(P(\theta_1)) \quad (6)$$

$$\theta_2^o = \min(J_i(\theta_1^o \theta_2)) \quad (7)$$

When the set of optimal parameters $\theta_1^o$, $\theta_2^o$, the value for the shear modulus in the second class is identified as the predicted shear modulus for the adhesive layer 118 of the component 110.

Although the foregoing discussion has focused primarily on the use of the FEM 400 to generate the reference signals (in the form of the 2D-FFTs 450) for comparison against the multi-modal signals 310 (in the form of the signal representation 320), it should be noted that the comparison between the multi-modal signals 310 and the reference signals may be performed in alternative fashions. For example, the multi-modal signals 310 may be compared against reference signals obtained via experimentation with adhesively-bonded components having known characteristics. By way of another example, the multi-modal signals 310 could be compared to reference signals having been used to train a neural network, for instance a convolutional neural network (CNN). The multi-modal signals 310, or the signal representation 320, could be provided as an input to a CNN having been trained on reference signals, for instance 2D-FFTs, which could be based on simulations (e.g., using the FEM 400), based on experimental data, or any suitable combination thereof. Other approaches are also considered.

Figure 6:
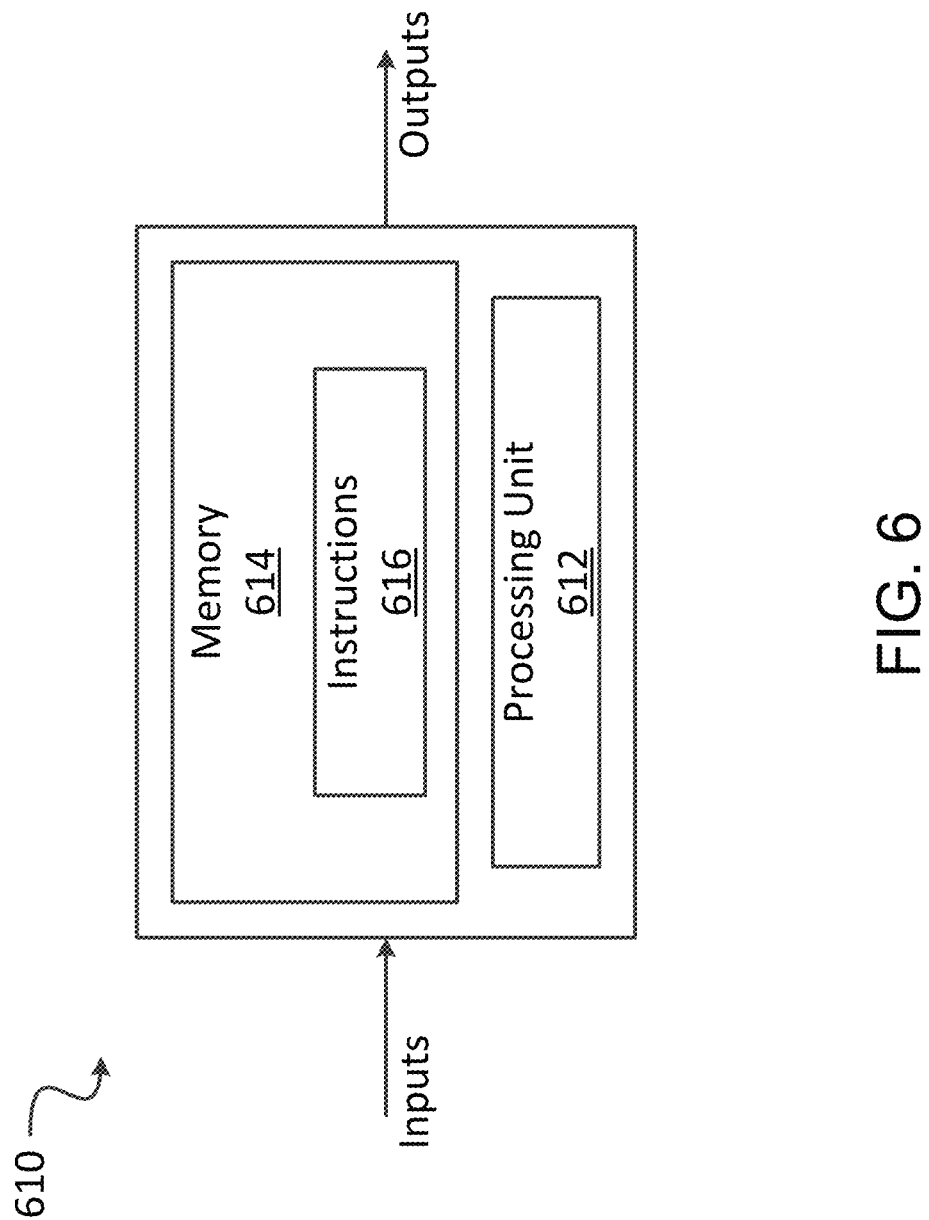
FIG. 6 is a block diagram illustrating an example computing device.

With reference to FIG. 6, a schematic diagram of an example computing device 610 is illustrated. As depicted, computing device 610 includes at least one processor 612, a memory 614 storing instructions 616, and at least one I/O interface (illustrated as 'Inputs' and 'Outputs'). One or more element of the UT system 150, including part or all of the processing system 170 may be implemented by way of the computing device 610. For simplicity only one computing device 610 is shown but system may include more computing devices 610 operable by users to access remote network resources and exchange data. The computing devices 610 may be the same or different types of devices. The elements of the computing device 610 may be connected in various ways including directly coupled, indirectly coupled via a network, and distributed over a wide geographic area and connected via a network (which may be referred to as "cloud computing").

Each processor 612 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 614 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O interface enables the computing device 610 to interconnect with one or more input devices, such as a keyboard, mouse, camera, touch screen and a microphone, or with one or more output devices such as a display screen and a speaker. Additionally, the I/O interface may facilitate the exchange of information and/or commands between the processing system 170, when implemented via the computing device 610, and the ultrasound probe 160.

In some embodiments, the computing device 610 includes one or more network interfaces to enable the computing device 610 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 7:
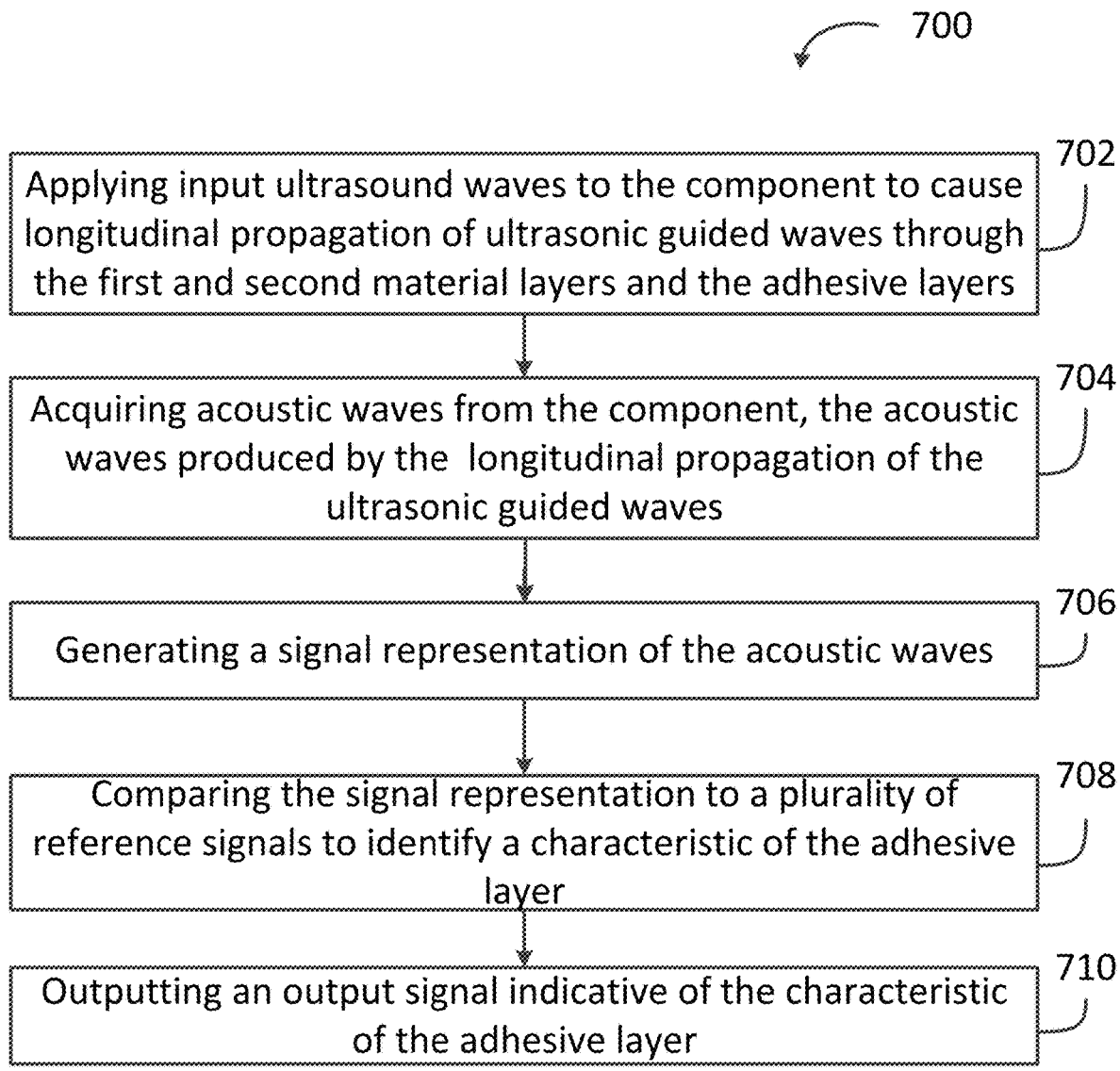
FIG. 7 is a flowchart illustrating an example method for performing UT of a component.

With reference to FIG. 7, a method 700 for performing ultrasound testing of a component, for instance the component 110, is illustrated. The component 110 being tested comprises the first and second material layers 112, 114 which are bonded by the adhesive layer 118, as illustrated in FIGS. 1A-1B. The method 700 may be performed by the UT system 150, or by the processing system 170. For instance, the processing system 170 may command or otherwise operate the ultrasound probe 160 to perform certain actions, as appropriate.

At step 702, the method 700 comprises applying input ultrasound waves to the component 110 to cause longitudinal propagation of ultrasonic guided waves, for instance the ultrasonic guided waves 154, through the first and second material layers 112, 114 and the adhesive layer 118. The application of the input ultrasound waves can be performed using an ultrasound probe, for example the ultrasound probe 160, which may include one or more emitters to produce input ultrasound waves, for instance emitter 162 which produces the input ultrasound waves 152. The input ultrasound waves 152 may be applied to the component 110 at an angle substantially perpendicular to the direction of propagation of the longitudinal ultrasound waves 154, that is to say, perpendicular to a longitudinal direction of the first layer of contact, such as layer 114.

The ultrasonic guided waves caused to longitudinally propagate through the through the first and second material layers 112, 114 and the adhesive layer 118 propagate in different modes. For example, the application of the input ultrasound waves may cause propagation of a first mode (e.g., the mode 204) in the first material layer 112, a second mode (e.g., the mode 202) in the second material layer 114, and a third mode (e.g., the mode 208) in the adhesive layer 118. In some other embodiments, any one of the layers 112, 114, 118 may have more than one mode propagating therein.

At step 704, the method 700 comprises acquiring acoustic waves from the component at a probe, for instance the ultrasound probe 160. The acoustic waves may be produced by the longitudinal propagation of the ultrasonic guided waves 154, and may be acquired by way of one or more receivers of the ultrasound probe, for instance the receivers 164. The acoustic waves may be captured over any suitable time period, for instance in response to emission of the input ultrasound waves 152 by the emitter 162.

At step 706, the method 700 comprises generating a signal representation of the acoustic waves. For example, the signal representation may correspond to the multi-modal signals 310, the signal representation 320, or any other suitable representation. Thus, in some embodiments, generating the signal representation of the acoustic waves comprises producing the signal representation 320 by applying a 2D-FFT to the multi-modal signals 310.

At step 708, the method 700 comprises comparing the signal representation of the acoustic waves to a plurality of reference signals, for instance by comparing the signal representation 320 to the 2D-FFTs 450. The comparing may be used to identify a characteristic of the adhesive layer 118, of the adhesive bond 120, and/or of the adhesive which composes the adhesive layer 118, including a shear modulus, a Poisson's coefficient, stiffness tensor components, a density, or the like. Alternatively, or in addition, the comparing may be used to identify the presence (or absence) of defects in the component 110, for instance the presence of wrinkles in the adhesive bond 120. Other indications of the bond quality of the adhesive bond 120 may also be provided.

In some embodiments, an error function having as inputs the signal representation of the acoustic waves and the plurality of reference signals may be used to select one of the plurality of reference signals. The reference signals may be model signals based on a model representation of the component, for instance the FEM 400, and the method 700 may include generating the plurality of model signals by simulating an acquisition of simulated acoustic waves from the FEM 400.

In some other embodiments, the signal representation of the acoustic waves may be compared to experimental signals based on experimental data collected from a plurality of reference components. In some further embodiments, the signal representation of the acoustic waves may be compared to reference signals generated using a machine-learning algorithm, for instance a convolutional neural network (CNN), in which the machine-learning algorithm produces simulated acoustic waves and associated simulated representations of the component.

At step 710, the method 700 comprises outputting an output signal indicative of the characteristic of the adhesive layer 120. As used herein, outputting of the output signal may comprise outputting to a display device or to another computing device and/or processing system, which may be local or remote to the processing system 170. The output signal may be output by the processing system 170, or by the UT system 150 generally, for presentation to an operator on a display, for storage in a data store or other repository, or the like. The characteristic may include an identification of a bond quality of the adhesive layer 118, which may be based on the shear modulus of the adhesive bond 120, or any other suitable information. For example, the characteristic may relate to shear modulus, Poisson's coefficient, stiffness tensor components, adhesive density, the presence of wrinkles, and any other known parameter of property representative of adhesive bond quality that may be evaluated through UT techniques. In some embodiments, outputting the output signal indicative of the characteristics of the adhesive layer comprises providing known characteristics of an adhesive layer associated with the reference signal selected through the comparing at step 708. For example, a look-up table may be used to select the known characteristics of the associated adhesive layer as a function of the selected reference signal. Alternatively or in combination therewith, outputting the output signal comprises providing expected values for characteristics of the adhesive layer under test based on a similarity of the signal representation of the acoustic waves to the selected reference signal. For example, if the selected reference signal and the signal representation differ by a given percentage, such as 1%, 3%, 5%, or any other percentage, then the expected values for characteristics of the adhesive layer under test may be estimated based on this difference, by applying a scaling factor corresponding to the difference to the known characteristics of the associated adhesive layer. Any known techniques for estimating the characteristics of the adhesive layer under test based on similarities between the signal representation and the reference signals may be used.

Throughout the present disclosure, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For example, and without limitation, the computing device 610 may be a server, network appliance, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein The present disclosure provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used. The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims. It should be understood that the examples described above and illustrated herein are intended to be examples only.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps. Additionally, the scope of the following claims should not be limited by the embodiments set forth in the examples, but should be given the broadest reasonable interpretation consistent with the description as a whole.

The invention claimed is:

1. A method for performing ultrasound testing of a component comprising a first material layer and a second material layer bonded by an adhesive layer, the method comprising:
applying input ultrasound waves to the component to cause longitudinal propagation of ultrasonic guided waves through the first material layer, the second material layer and the adhesive layer;
acquiring acoustic waves from the component, wherein the acoustic waves are produced by the longitudinal propagation of the ultrasonic guided waves;
generating a signal representation of the acoustic waves;
comparing the signal representation of the acoustic waves to a plurality of reference signals to identify a characteristic of the adhesive layer; and
outputting an output signal indicative of the characteristic of the adhesive layer.

2. The method of claim 1, wherein applying the input ultrasound waves to the component comprises applying the input ultrasound waves perpendicular to a longitudinal direction of the first material layer and the second material layer.

3. The method of claim 1, wherein applying the input ultrasound waves to the component comprises causing propagation of a first mode in the first material layer, a second mode in the second material layer, and a third mode in the adhesive layer.

4. The method of claim 1, wherein generating the signal representation of the acoustic waves comprises applying a two-dimensional fast-Fourier transform to the acoustic waves.

5. The method of claim 1, wherein comparing the signal representation of the acoustic waves to the plurality of reference signals comprises minimizing an error function having as inputs the signal representation of the acoustic waves and the plurality of reference signals, and selecting one of the plurality of reference signals based on the minimizing of the error function.

6. The method of claim 1, wherein comparing the signal representation of the acoustic waves to the plurality of reference signals comprises comparing the signal to a plurality of model signals based on a model representation of the component.

7. The method of claim 6, further comprising generating the plurality of model signals by simulating an acquisition of simulated acoustic waves from a finite element model representing the component.

8. The method of claim 1, wherein comparing the signal representation of the acoustic waves to the plurality of reference signals comprises comparing the signal to a plurality of experimental signals based on experimental data collected from a plurality of reference components.

9. The method of claim 1, wherein comparing the signal representation of the acoustic waves to the plurality of reference signals to identify the characteristic of the adhesive layer comprises identifying a bond quality of the adhesive layer.

10. A system for performing ultrasound testing of a component comprising a first material layer and a second material layer bonded by an adhesive layer, the system comprising:
a processing unit; and
a non-transitory computer-readable medium having stored thereon instructions executable by the processing unit for:
applying input ultrasound waves to the component to cause longitudinal propagation of ultrasonic guided waves through the first material layer, the second material layer and the adhesive layer;
acquiring acoustic waves from the component, wherein the acoustic waves are produced by the longitudinal propagation of the ultrasonic guided waves;
generating a signal representation of the acoustic waves;
comparing the signal representation of the acoustic waves to a plurality of reference signals to identify a characteristic of the adhesive layer; and
outputting an output signal indicative of the characteristic of the adhesive layer.

11. The system of claim 10, wherein applying the input ultrasound waves to the component comprises applying the input ultrasound waves perpendicular to a longitudinal direction of the first and second material layers.

12. The system of claim 10, wherein applying the input ultrasound waves to the component comprises causing propagation of a first mode in the first material layer, a second mode in the second material layer, and a third mode in the adhesive layer.

13. The system of claim 10, wherein generating the signal representation of the acoustic waves comprises applying a two-dimensional fast-Fourier transform to the acoustic waves.

14. The system of claim 10, wherein comparing the signal representation of the acoustic waves to the plurality of reference signals comprises minimizing an error function having as inputs the signal representation of the acoustic waves and the plurality of reference signals, and selecting one of the plurality of reference signals based on the minimizing of the error function.

15. The system of claim 10, wherein comparing the signal representation of the acoustic waves to the plurality of reference signals comprises comparing the signal to a plurality of model signals based on a model representation of the component.

16. The system of claim 15, wherein the instructions are further executable for generating the plurality of model signals by simulating an acquisition of simulated acoustic waves from a finite element model representing the component.

17. The system of claim 10, wherein comparing the signal representation of the acoustic waves to the plurality of reference signals comprises comparing the signal to a plurality of experimental signals based on experimental data collected from a plurality of reference components.

18. The system of claim 10, wherein comparing the signal representation of the acoustic waves to the plurality of reference signals to identify a characteristic of the adhesive layer comprises identifying a bond quality of the adhesive layer.

\* \* \* \* \*